(12) United States Patent
Adcock et al.

(10) Patent No.: US 11,704,399 B2
(45) Date of Patent: Jul. 18, 2023

(54) MEDIUM FOR TEMPORARY ACCOUNT ACCESS

(71) Applicant: Capital One Services, LLC, McLean, VA (US)

(72) Inventors: Lee Adcock, Midlothian, VA (US); Nahid Farhady Ghalaty, Fairfax, VA (US); Vincent Pham, Champaign, IL (US); Christopher Camenares, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 196 days.

(21) Appl. No.: 16/950,058

(22) Filed: Nov. 17, 2020

(65) Prior Publication Data

US 2022/0156355 A1 May 19, 2022

(51) Int. Cl.
*G06F 21/34* (2013.01)
*G06K 7/10* (2006.01)

(52) U.S. Cl.
CPC ......... *G06F 21/34* (2013.01); *G06K 7/10366* (2013.01)

(58) Field of Classification Search
CPC ............................. G06F 21/34; G06K 7/10366
USPC .......................................................... 726/7
See application file for complete search history.

(56) References Cited

U.S. PATENT DOCUMENTS

| 10,489,780 B2 | 11/2019 | Miller et al. | |
| 2010/0133334 A1 | 6/2010 | Vadhri | |
| 2012/0191612 A1 | 7/2012 | Spodak et al. | |
| 2013/0134216 A1 | 5/2013 | Spodak et al. | |
| 2013/0200999 A1 | 8/2013 | Spodak et al. | |
| 2014/0138435 A1* | 5/2014 | Khalid | G06Q 20/227 235/380 |
| 2015/0186872 A1* | 7/2015 | Sobol | G06Q 20/351 705/41 |
| 2016/0189123 A1* | 6/2016 | Lucia Specogna | G06Q 20/1085 705/43 |

FOREIGN PATENT DOCUMENTS

WO  2013112839 A1  8/2013

OTHER PUBLICATIONS

International Search Report and Written Opinion for Application No. PCT/US2021/072373, dated Mar. 14, 2022, 11 pages.

* cited by examiner

*Primary Examiner* — Ahshik Kim
(74) *Attorney, Agent, or Firm* — Harrity & Harrity, LLP

(57) ABSTRACT

In some implementations, a physical medium may include a radio frequency (RF) component and an integrated circuit (IC) chip component. The physical medium may be configured to detect, via the RF component, that the physical medium is within a communicative proximity of a first user device or a first medium associated with a first account. The physical medium may communicate, via the RF component, with the first user device or the first medium based on detecting that the physical medium is within the communicative proximity of the first user device or the first medium. The physical medium may configure the IC chip component to indicate that the physical medium is paired with the first account. The physical medium may transmit, via the RF component or the IC chip component and to a terminal, an indication that the physical medium is paired with the first account.

20 Claims, 7 Drawing Sheets

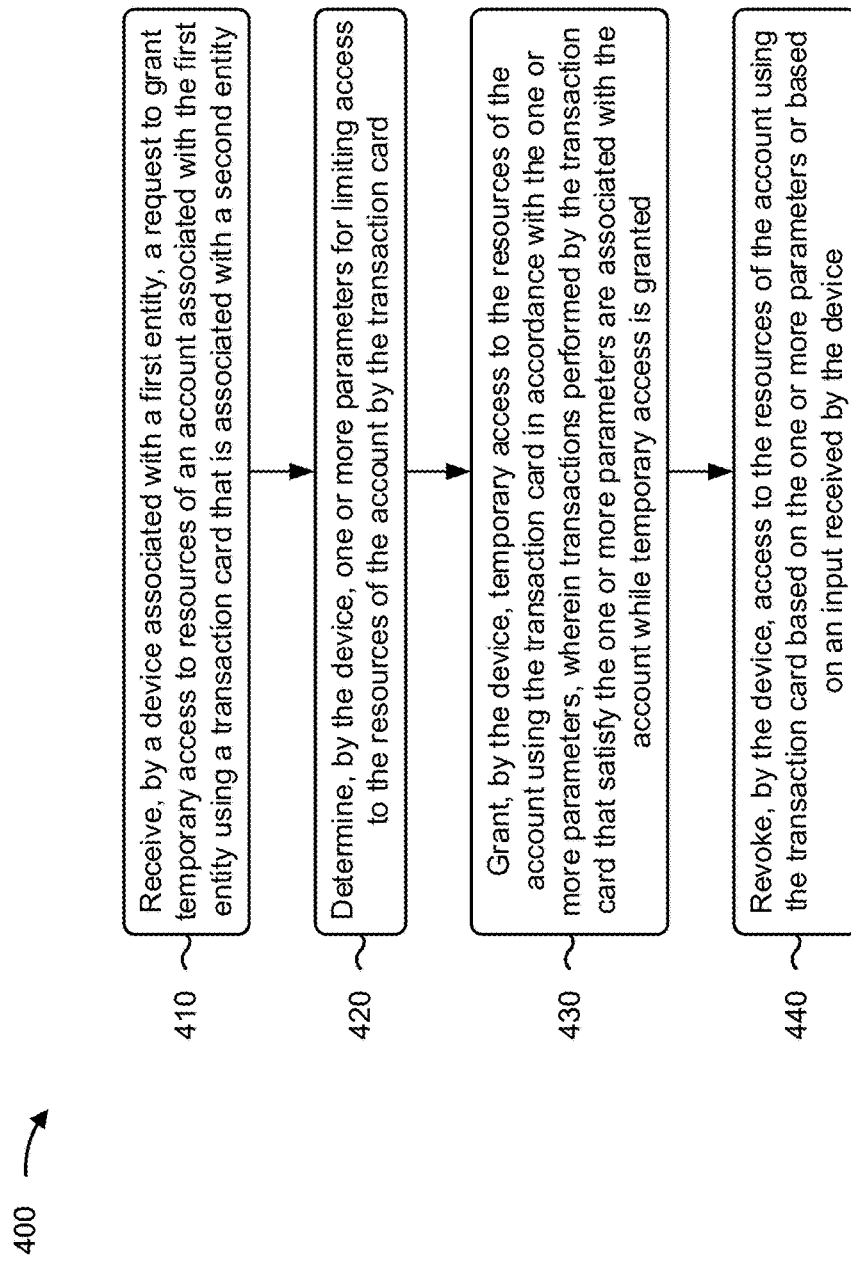

MEDIUM FOR TEMPORARY ACCOUNT ACCESS

BACKGROUND

A physical medium may be used to access resources of an account. The physical medium may include a radio frequency (RF) component for communicating with other physical mediums or other devices. The physical medium may include an integrated circuit (IC) chip component to improve security with respect to the use of the physical medium.

SUMMARY

In some implementations, a physical medium includes a radio frequency (RF) component; an integrated circuit (IC) chip component; a memory; and one or more processors, communicatively coupled to the memory, configured to: detect, via the RF component, that the physical medium is within a communicative proximity of a first user device or a first medium associated with a first account, wherein the physical medium is not permanently associated with an account; communicate, via the RF component, with the first user device or the first medium based on detecting that the physical medium is within the communicative proximity of the first user device or the first medium, wherein communicating includes: transmitting an indication of an identifier associated with the physical medium, and receiving an indication that the physical medium is temporarily paired with the first account, wherein the physical medium is temporarily paired with the first account based on one or more restrictions; configure the IC chip component to indicate that the physical medium is paired with the first account based on receiving the indication that the physical medium is to be paired with the first account; detect, via the RF component or the IC chip component, that the physical medium is within a communicative proximity of a terminal; and transmit, via the RF component or the IC chip component and to the terminal, an indication that the physical medium is paired with the first account, wherein the terminal performs an action associated with the first account based on the indication that the physical medium is paired with the first account.

In some implementations, a method includes receiving, by a device associated with a first entity, a request to grant temporary access to resources of an account associated with the first entity using a transaction card that is associated with a second entity; determining, by the device, one or more parameters for limiting access to the resources of the account by the transaction card; granting, by the device, temporary access to the resources of the account using the transaction card in accordance with the one or more parameters, wherein transactions performed by the transaction card that satisfy the one or more parameters are associated with the account while temporary access is granted; and revoking, by the device, access to the resources of the account using the transaction card based on the one or more parameters or based on an input received by the device.

In some implementations, a non-transitory computer-readable medium storing a set of instructions includes one or more instructions that, when executed by one or more processors of a server device, cause the server device to: associate information of a first entity with an identifier of a payment medium; receive a request to pair the identifier of the payment medium with an account that is associated with a second entity; identify one or more parameters associated with pairing the identifier of the payment medium with the account that is associated with the second entity, wherein the one or more parameters limit access to resources of the account by the payment medium; pair the identifier of the payment medium with the account that is associated with the second entity; receive an indication of a transaction initiated by the payment medium; and performing an action based on whether the transaction satisfies the one or more parameters, wherein the action includes: completing the transaction using the resources of the account that is associated with the second entity if the transaction satisfies the one or more parameters, or denying the transaction if the transaction does not satisfy the one or more parameters.

BRIEF DESCRIPTION OF THE DRAWINGS

FIG. 4 is a flowchart of an example process relating to a medium for temporary account access.

DETAILED DESCRIPTION

Figure 1A:
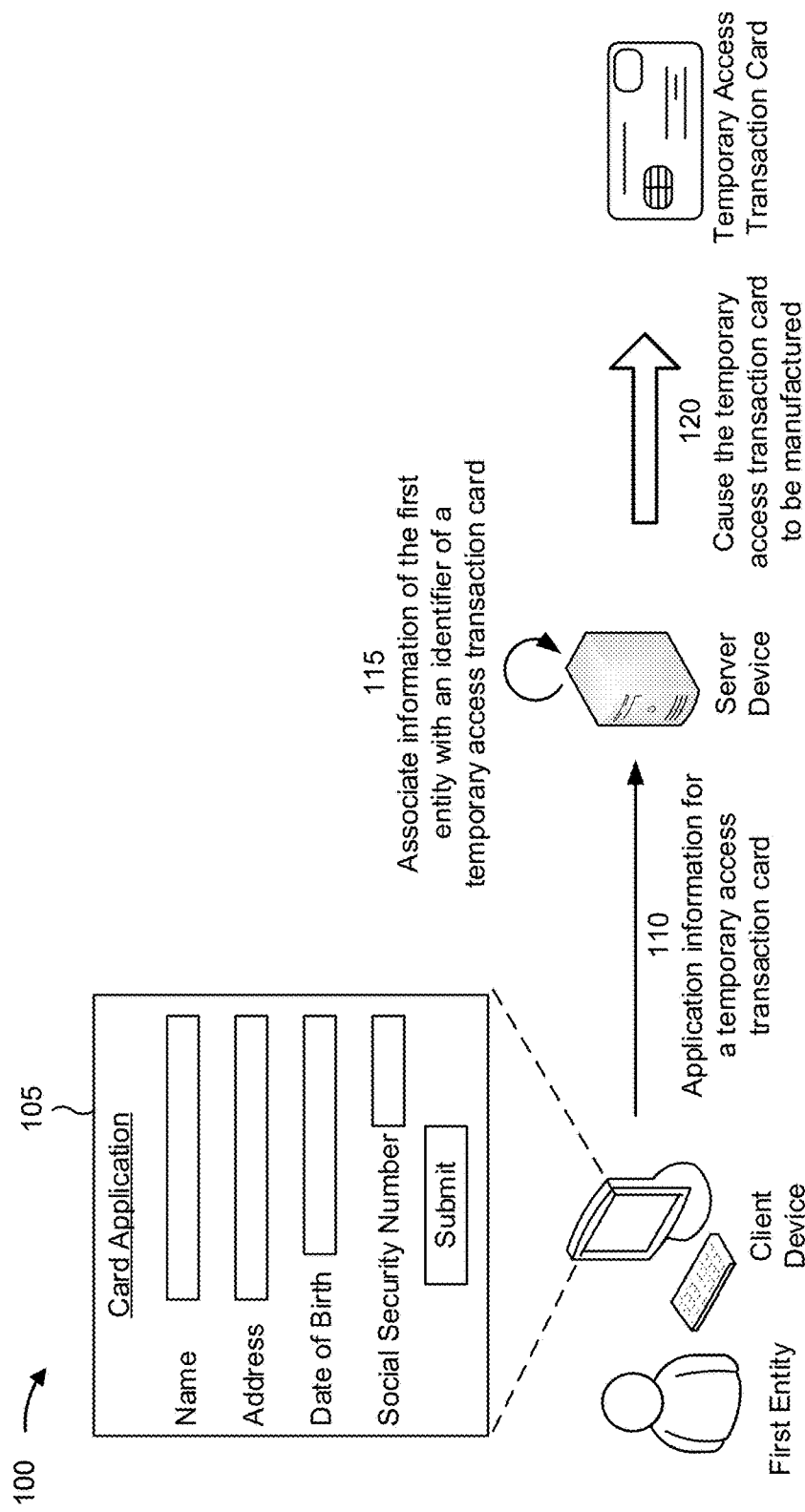
FIGS. 1A-1D are diagrams of an example implementation relating to a medium for temporary account access.

The following detailed description of example implementations refers to the accompanying drawings. The same reference numbers in different drawings may identify the same or similar elements.

An account owner may manage access to an account. For example, the account owner may manage authorized users who may access the account and complete transactions using resources (e.g., credit resources, debit resources, or funds) of the account. The account owner may add an authorized user by submitting a request to the institution associated with the account. The request may identify information of the authorized user, such as name, address, date of birth, and/or social security number. The institution may receive and process the request by confirming the information of the authorized user and creating account information for the authorized user. The institution may then create a transaction card for the authorized user for the authorized user to use to complete transactions using the resources of the account. To remove the authorized user, the account owner may need to submit another request to the institution. The institution may receive and process the request to remove the authorized user from the account.

In some cases, it may be beneficial for the account owner to grant temporary access to the account to a third party. The account owner may need a third party to complete one or more transactions on behalf of the account owner. For example, the account owner may employ a contractor to perform work on the account owner's home. The contractor may need to make one or more purchases on behalf of the account owner to complete the work. As another example, the account owner may wish to grant temporary access to the account to a babysitter who is watching a child of the account owner to allow the babysitter to complete transactions using the resources of the account while the babysitter is watching the child of the account owner.

However, enabling the third party to access the account as an authorized user would require the account owner to provide a request to an institution, would require the institution to receive and process the request, would require the institution to add the third party as an authorized user, and would require the institution to provide a medium, such as a transaction card, for the third party to use to conduct transactions using resources of the account. This consumes significant computing resources by requiring the account owner to transmit the request using a device and/or by requiring the institution to process the request using one or more servers. Further, this process is very time consuming and requires the third party to wait until a transaction card is sent to them to be able to conduct transactions using the resources of the account. Moreover, the third party may be required to share sensitive information (such as an address, a date of birth, and/or a social security number) with the account owner to allow the account owner to add the third party as an authorized user. Also, to remove the third party as an authorized user, additional computing resources are consumed that are used to request that the third party be removed as an authorized user and/or to process the request to remove the third party as an authorized user.

Additionally, adding a third party as an authorized user is a more permanent action that does not allow an account owner to manage transactions completed by the authorized user and/or to manage a level of access to the resources of the account by the third party. For example, once added as an authorized user, the third party may be able to make any purchases using the resources of the account until the third party is removed as an authorized user by the account owner. Using an example from above, the account owner may wish to grant access to the account for a contractor to conduct transactions for only building supplies. However, once added as an authorized user, the contractor may be able to conduct transactions for any good or service. In some cases, a spending limit may be imposed on the third party by the account owner, but the account owner may be unable to manage the type of transactions and/or the amount of the time that the authorized user has access to the account. This may result in unauthorized transactions and/or fraud by the third party as an authorized user. The account owner may waste computing resources attempting to identify and remedy the unauthorized transactions, such as by requesting a refund.

To grant temporary access to an account, an institution may create a temporary account identifier (e.g., a virtual card number) that is provided to the account owner. The temporary account identifier may be set to expire after an amount of time. The temporary account identifier can be used to conduct transactions (by the account owner or a third party) that are completed using resources of the account. However, a party may be unable to use the temporary account identifier to conduct transactions in situations where a physical medium is required to complete the transactions, such as for in-person transactions (rather than online transactions). Moreover, the account owner may be unable to restrict the types of transactions that are made using the temporary account identifier, thereby resulting in a risk of unauthorized purchases, as described above.

Some implementations described herein provide a medium for temporary account access. For example, a transaction card or other physical medium, that is not associated with an account having resources, may be created or provided. That is, the transaction card may be associated with an account identifier, but the transaction card may not be permanently associated with an account that can be used to complete transactions, such as a credit account or a debit account. The transaction card may be temporarily paired or associated with an account that has resources that can be used to complete transactions (e.g., an account that can be used to complete transactions). The transaction card may be paired with the account for a certain amount of time. Additionally, or alternatively, the transaction card may be paired with the account in accordance with one or more parameters that limit the types of transactions that can be completed using the transaction card while paired with the account. An account owner may grant access to the account by requesting that an institution associated with the account pair the transaction card with the account, such that all transactions (that satisfy the one or more parameters) conducted using the transaction card are completed using resources of the account. The institution may automatically unpair the transaction card from the account after a certain amount of time, may unpair the transaction card from the account if one or more of the parameters are violated, and/or may unpair the transaction card from the account if the account owner actively requests that the transaction card be unpaired from the account.

Therefore, account owners may be enabled to grant temporary access to the account to a third party by temporarily pairing the transaction card to the account, thereby enabling transactions conducted using the transaction card to be completed using resources of the account. As a result, computing resources may be conserved because the account owner does not need to add the third party as an authorized user of the account, thereby conserving computing resources that would have otherwise been used to request to add the third party as an authorized user, to process the request, and to add the third party as an authorized user. Moreover, computing resources may be conserved that would have otherwise been used to remove the third party as an authorized user. Additionally, enabling the account owner to pair the transaction card with the account, in accordance with one or more parameters that limit the types of transactions that can be completed using the transaction card while paired with the account, improves security of the account as unauthorized transactions may not be completed using the transaction card. This conserves computing resources that would have otherwise been used to identify and remedy the unauthorized transactions, and can also reduce fraud.

FIGS. 1A-1D are diagrams of an example 100 associated with a medium for temporary account access. As shown in FIGS. 1A-1D, example 100 includes a client device, a user device, a server device for managing accounts and account access, and a transaction terminal that communicates with the server device and/or a transaction backend to complete transactions initiated by a temporary access transaction card. These devices are described in more detail in connection with FIGS. 2 and 3.

As shown by reference number 105, a first entity may use a client device to apply for a temporary access transaction card. For example, the first entity may use the client device to interact with (e.g., view, fill, or complete) an application form. The application form may be a credit application form for a service provided by an institution that is associated with the server device. The application form may be provided to the client device by the server device. The application form may be viewed on the client device via a webpage or an application, among other examples.

The first entity may interact with the client device to input application information into the application form. The application information may include a name of the first entity, geographic information associated with the first entity (e.g., an address, a city, a state, and/or a postal code, among other examples), a date of birth of the first entity, and/or a social security number of the first entity, among other examples. As shown by reference number 110, the client device may transmit the application information to the server device.

As shown by reference number 115, the server device may associate information of the first entity with an identifier of a temporary access transaction card. For example, the server device may receive the application information and may determine whether to approve the application for the temporary access transaction card. If the server device determines that the application is approved, then the server device may create an account associated with the first entity for a temporary access transaction card. In some implementations, the account is not associated with resources that can be used to complete transactions. That is, the account may associate the information of the first entity with an identifier of a temporary access transaction card. However, if the temporary access transaction card is used to conduct a transaction (e.g., without being paired or associated with another account, as described in more detail below), then the transaction will be denied.

Alternatively, the temporary access transaction card account may be associated or linked with a first account (e.g., a credit account or a debit account) associated with the first entity, but not initially associated with a second account of a second entity that grants temporary access to the second account via the temporary access transaction card, as described in more detail below. For example, the temporary access transaction card account may be linked to the first account of the first entity for the purpose of tracking reward points or other benefits. In this example, the temporary access transaction card and the first account are associated, but the temporary access transaction card does not have access to resources of the first account. As a result, when the first entity uses the temporary access transaction card to complete a transaction, information associated with the transaction may be stored and/or associated with the first account (e.g., a linked account that is linked to the temporary access transaction card). For example, the first entity may use the temporary access transaction card to complete a transaction, where the transaction is completed using resources of a second account associated with the second entity. However, a transaction amount of the transaction may be associated with the first account (but not completed using the resources of the first account), such that the first entity may be able to realize benefits from the first account, such as earning reward points through transactions, while using funds from a second account. This may conserve computing resources that would have otherwise been used to bill an entity associated with the second account if the first entity used resources of the first account to complete the transactions, while also enabling the first entity to earn reward points from the first account.

As shown by reference number 120, the server device may cause the temporary access transaction card to be manufactured. For example, the server device may provide instructions to a manufacturing system to manufacture the temporary access transaction card. In some implementations, the server device may cause the temporary access transaction card to be manufactured with an account identifier included on the surface of the temporary access transaction card. In some implementations, the server device may cause the temporary access transaction card to be manufactured without an account identifier included on the surface of the temporary access transaction card. The server device may cause the temporary access transaction card to be sent to the first entity.

In some implementations, the server device does not cause a physical temporary access transaction card to be manufactured. Rather, the server device may create an account with a transaction application (e.g., a digital wallet and/or a payment application) that is associated with the first entity. The first entity may execute the transaction application on a user device (not shown in FIGS. 1A-1D) associated with the first entity. The first entity may use the user device that is executing the transaction application to conduct transactions via the transaction application. Therefore, actions described herein as being performed by (or associated with) the temporary access transaction card may be performed in a similar manner by a user device executing a transaction application.

Figure 1B:
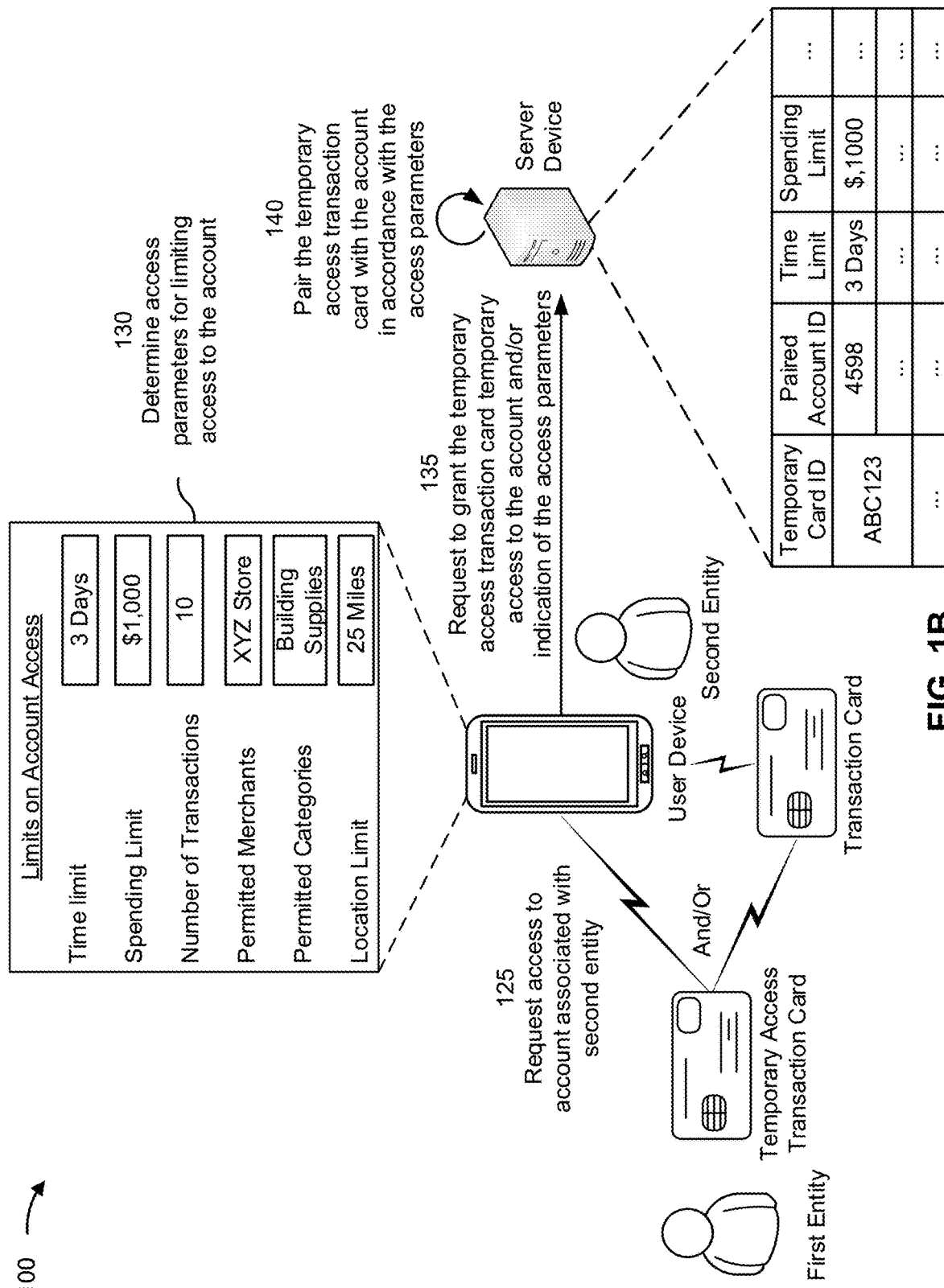

As shown in FIG. 1B, the first entity may need to conduct one or more transactions on behalf of a second entity. The second entity may grant the first entity access to resources of an account associated with the second entity via a temporary access transaction card. In some implementations, the temporary access transaction card may be associated with the first entity. In some implementations, the temporary access transaction card may be associated with the second entity. For example, the second entity may apply for and receive a temporary access transaction card as described above. The second entity may provide the temporary access transaction card to the first entity to enable the first entity to complete transactions using the resources of the account associated with the second entity, as described in more detail below.

As shown by reference number 125, the first entity may request access to the account associated with the second entity via the temporary access transaction card. In some implementations, the temporary access transaction card may communicate (e.g., via radio frequency (RF) communication, such as near field communication (NFC)) with a user device associated with the second entity. For example, the temporary access transaction card may be placed within a communicative proximity of the user device. The temporary access transaction card may transmit identification information associated with the temporary access transaction card, such as an identifier of the temporary access transaction card, to the user device to prompt the user device to grant the temporary access transaction card access to the account associated with the second entity. In some implementations, the user device may scan or read, using a camera of the user device, one or more symbols or images on the temporary access transaction card to obtain the identification information. For example, the user device may scan a quick response (QR) code displayed or printed on the temporary access transaction card.

In some implementations, the temporary access transaction card may communicate, via NFC, with a transaction card associated with the second entity. For example, the temporary access transaction card may be placed within a communicative proximity of the transaction card that is associated with the account of the second entity (which may be referred to as a "grantor account" in some examples). The temporary access transaction card may transmit the identification information to the transaction card. In some implementations, the transaction card may transmit the identification information to the user device.

In some implementations, the temporary access transaction card does not communicate with the user device or the transaction card. For example, the second entity may input the identifier of the temporary access transaction card into the user device to prompt the user device to grant the temporary access transaction card access to the account (e.g., in a scenario where the identifier is printed on the surface of the temporary access transaction card).

In some implementations, when the temporary access transaction card communicates with the user device or the transaction card, the temporary access transaction card may receive an indication to configure (or re-configure) an integrated circuit (IC) chip of the temporary access transaction card. For example, the temporary access transaction card may receive account information associated with the account, such as an account identifier, a temporary identifier, or a transaction token. The IC chip of the temporary access transaction card may be configured to indicate the account information when the temporary access transaction card interacts with a transaction terminal, as described in more detail below.

In some implementations, the IC chip (or another component) of the temporary access transaction card is not configured to indicate information associated the grantor account. For example, the temporary access transaction card may be configured to indicate information associated with the temporary access transaction card, such the identifier of the temporary access transaction card. A backend system may receive the identifier of the temporary access transaction card and determine the account (or accounts) that the temporary access transaction card is paired with, as described in more detail below. Therefore, the temporary access transaction card may not need to be re-configured when the temporary access transaction card is paired with an grantor account.

As shown by reference number 130, the user device may determine one or more parameters for limiting the temporary access transaction card's access to the account (referred to herein as one or more "access parameters"). An access parameter may be used by a server device and/or a transaction backend to determine an amount of time that the temporary access transaction card is to be allowed access to the account. Additionally, or alternatively, an access parameter may be used by a server device or a transaction backend to determine whether a transaction initiated by the temporary access transaction card is to be approved and completed using resources of the account.

An access parameter may include a time parameter, a transaction amount parameter, a transaction frequency parameter, a permitted entity parameter, a permitted category parameter, and/or a geographic parameter, among other examples. The time parameter may indicate an amount of time that the temporary access transaction card is to be permitted access to the account (e.g., an amount of time that the temporary access transaction card is to be paired, or otherwise associated with, the account, as described in more detail below). The transaction amount parameter may indicate a limit on the amount that the temporary access transaction card can charge using resources of the account. The transaction amount parameter may indicate a limit on an amount the temporary access transaction card can charge in a single transaction and/or over the entire amount of time that the temporary access transaction card has access to the account. The transaction amount parameter may be referred to as a spending limit or a credit limit.

The transaction frequency parameter may indicate a number of transactions that the temporary access transaction card is permitted to complete while the temporary access transaction card has access to the account. Additionally, or alternatively, the transaction frequency parameter may indicate a number of transactions that the temporary access transaction card is permitted to complete over a period of time (e.g., a number of transactions allowed per hour, per day, and/or per week, among other examples). The permitted entity parameter may indicate one or more entities at which the temporary access transaction card is permitted to conduct transactions while the temporary access transaction card has access to the account. For example, the permitted entity parameter may indicate one or more merchants at which the temporary access transaction card is permitted to complete transactions. In some implementations, the permitted entity parameter may indicate a merchant category, and merchants included in that merchant category may be permitted merchants.

The permitted category parameter may indicate one or more categories of goods or services that the temporary access transaction card is permitted to purchase while the temporary access transaction card has access to the account. For example, the permitted category parameter may indicate that the temporary access transaction card is permitted to purchase goods or services related to building supplies. In another example, the permitted category parameter may indicate that the temporary access transaction card is permitted to purchase goods or services related to food purchases (e.g., grocery purchases and/or restaurant purchases). The geographic parameter may indicate a location range in which the temporary access transaction card is permitted to complete transactions while the temporary access transaction card has access to the account. For example, the geographic parameter may indicate a maximum distance from a location associated with the second entity (e.g., an address or a zip code) that the temporary access transaction card can complete a transaction while the temporary access transaction card has access to the account. In some implementations, the geographic parameter may indicate a permitted geographic region in which the temporary access transaction card is permitted to complete transactions. For example, the geographic parameter may indicate a city, a town, a zip code, a set of cities, and/or a set of zip codes.

In some implementations, the second entity may input one or more access parameters using an application or web page executing on the user device. The application or web page may be provided by the institution associated with the account. The second entity may input values or information for the one or more access parameters. For example, the second entity may indicate that a value of the time parameter is 3 days, a value of the transaction amount parameter is $1,000, a value for the transaction frequency parameter is 10 transactions, and/or a value of the geographic parameter is 25 miles. In some implementations, the second entity may input information for one or more access parameters. For example, the second entity may indicate that XYZ store is a permitted merchant (e.g., for the permitted entity parameter) or that a permitted category is building supplies (e.g., for the permitted category parameter).

Additionally, or alternatively, the user device may determine values or information for one or more access parameters from stored information. For example, the second entity may provide default or preferred values or information for one or more access parameters. The user device and/or the server device may store the provided values or information. The user device may retrieve the stored values and/or information from a memory when the user device is prompted to grant a temporary access transaction card access to the account (such as when the temporary access transaction card communicates with the user device and/or when the second entity provides an input to the user device to grant access).

As shown by reference number 135, the user device may transmit, to the server device, a request to grant the temporary access transaction card access to the account. In this way, the user device may grant the temporary access transaction card access to the account by transmitting, to the server device, the request to grant temporary access to the resources of the account by the temporary access transaction card. In some implementations, the request may indicate one or more (or all) access parameters. In some implementations, the server device may identify one or more (or all) access parameters by retrieving stored access parameters (e.g., default or preferred parameters) associated with the second entity from a memory.

As shown by reference number 140, the server device may pair, or otherwise associate, the temporary access transaction card with the account in accordance with the access parameters. For example, the server device may pair an identifier of the temporary access transaction card and an account identifier of the account in a database stored by the server device. The server device may pair the temporary access transaction card with the account such that when a transaction is initiated by the temporary access transaction card, the server device (and/or a transaction backend) may identify the account and the one or more access parameters and determine whether the transaction should be completed using the resources of the account.

In some implementations, the server device may determine whether the temporary access transaction card can be paired (e.g., is permitted to be paired or capable of being paired) with the account. For example, the server device may determine whether the temporary access transaction card is active (e.g., whether an account or identifier associated with the temporary access transaction card is active). Additionally, or alternatively, the server device may determine if the temporary access transaction card is already paired with another account other than the grantor account. In some implementations, the temporary access transaction card may only be paired with one grantor account at one time. In some implementations, the temporary access transaction card may be paired with multiple grantor accounts at one time (e.g., associated with the same or different entities). In that case, there may be a maximum number of accounts that the temporary access transaction card can be paired with at one time. If the server device determines that the temporary access transaction card is already paired with an account (e.g., if the temporary access transaction card can only be paired with a single account) or if the server device determines that the temporary access transaction card is already paired with the maximum number of accounts (e.g., if the temporary access transaction card can be paired with multiple accounts), then the server device may determine that the temporary access transaction card cannot be paired with the account associated with the second entity. In this example, the server device may transmit an indication to the user device indicating that the temporary access transaction card was unable to be paired with the account.

In some implementations, the server device may determine whether the temporary access transaction card is associated with any information indicating fraud. For example, the server device may determine that previous transactions performed by the temporary access transaction card indicate fraud. In some implementations, the server device may request and/or receive a report of fraud associated with the temporary access transaction card, such as based on receiving the request to grant account access to the temporary access transaction card. In some implementations, the server device may receive an indication that the temporary access transaction card has been stolen or lost. As a result, the server device may determine that the temporary access transaction card is not permitted to be paired with the account associated with the second entity. In this example, the server device may transmit an indication to the user device indicating that the temporary access transaction card was unable to be paired with the account. In some implementations, the server device may transmit an indication to the user device indicating that the temporary access transaction card has been associated with fraudulent activity and may request confirmation to proceed with pairing the temporary access transaction card with the account.

If the server device determines that the temporary access transaction card can be paired with the account, then the server device may store information indicating that the temporary access transaction card is paired or associated with the account. In some implementations, the server device may create a transaction token for the temporary access transaction card. For example, the server device may create a transaction token (e.g., an identifier) that maps to account information associated with the account. The transaction token may map to the one or more access parameters such that when a transaction is initiated using the transaction token, the server device (and/or a transaction backend) may identify the account information and the one or more access parameters. In some implementations, the transaction token may be a temporary transaction token. For example, the transaction token may expire after an amount of time indicated by the time parameter.

The server device may transmit an indication to the user device that the temporary access transaction card has been successfully paired with the account. In some implementations, the server device may transmit an indication of a transaction token that is to be used by the temporary access transaction card to perform transactions that are to be completed using the resources of the account. The user device may provide an indication to the temporary access transaction card that the temporary access transaction card has been paired with the account. The user device may provide an indication of the transaction token to the temporary access transaction card. In some implementations, an IC chip of the temporary access transaction card may be configured to indicate the transaction token when communicating with a transaction terminal.

In some implementations, the server device may receive an indication that the temporary access transaction card is to be paired with an additional account (e.g., a third account associated with a third entity, sometimes referred to as a "second grantor account") while the temporary access transaction card is paired with the account associated with the second entity. For example, the temporary access transaction card may communicate with a user device and/or a transaction card associated with the third entity (not shown in FIGS. 1A-1D) in a similar manner as described above. The user device associated with the third entity may transmit a request to grant the temporary access transaction card access to the additional account. The server device may pair the temporary access transaction card with the additional account in a similar manner as described above. In this way, the temporary access transaction card may be paired with multiple accounts at the same time.

In some implementations, the first entity (e.g., via a user device or another device associated with the first entity) may select an active account from the multiple accounts paired with the temporary access transaction card. For example, the first entity may interact with the user device associated with the first entity to select the active account, and the user device may transmit an indication of the active account to the server device. The server device may identify the active account and may associate any transactions initiated by the temporary access transaction card with the active account (e.g., as described in more detail below) until a new active account is indicated to the server device (or until the active account is unpaired with the temporary access transaction card, as described in more detail below). In this case, the temporary access transaction card may be associated with a single token that is linked to multiple grantor accounts, and the server device may select which grantor account is to be used for a transaction based on the indication of the active account received from the user device. Additionally, or alternatively, the server device may select which grantor account is to be used for a transaction based on the one or more access parameters associated with each grantor account. For example, if a first set of access parameters for a first grantor account is not satisfied for a particular transaction, and a second set of access parameters for a second grantor account is satisfied for the particular transaction, then the server device may select the second grantor account as the active account to be charged for the particular transaction.

In some implementations, where the temporary access transaction card is associated with a single token that is linked to multiple grantor accounts, the server device (and/or a transaction backend) may associate transactions initiated using the single token to each of the multiple grantor accounts. For example, the server device (and/or a transaction backend) may split a transaction amount of a transaction between each of the multiple grantor accounts. In this way, a transaction may be split between multiple entities using a single transaction card. For example, a group of individuals may be sharing a meal at a restaurant. At least one individual may be associated with a temporary access transaction card. Each individual may pair a grantor account associated with the individual with the temporary access transaction card. The temporary access transaction card can then be used to complete the transaction for the meal, where the server device (and/or transaction backend) splits a total transaction amount for the meal between each grantor account. For example, if the temporary access transaction card is paired with 5 grantor accounts and a total transaction amount for the meal is $50, then the server device (and/or the transaction backend) may charge each grantor account $10 to complete the transaction. This may save time and conserve computing resources that would have otherwise been used if each individual completed separate transactions (using separate transaction cards) for their portion of the total transaction amount for the meal.

In some implementations, the temporary access transaction card can be configured to indicate an identifier associated with an active account, from the multiple accounts paired with the temporary access transaction card. For example, the server device may provide multiple transaction tokens (or identifiers) corresponding to the multiple accounts paired with the temporary access transaction card. An IC chip of the temporary access transaction card can be configured (e.g., via the user device associated with the first entity, such as based on user interaction with the user device to select an active account) to indicate the transaction token associated with an active account. If the active account is changed to a second account that is paired with the temporary access transaction card, then the IC chip can be configured to indicate the transaction token associated with the second account. In this case, the temporary access transaction card may be associated with multiple tokens that are each linked to a different grantor account. The first entity may toggle between different active accounts by interacting with the user device, which may indicate the activate account to the temporary access transaction card (e.g., using NFC). When performing a transaction, the temporary access transaction card may transmit a token corresponding to the active account. The server device may then use the token to identify the active account to be charged for the transaction because the token is associated with (e.g., in a data structure) an account identifier of the active account.

Figure 1C:
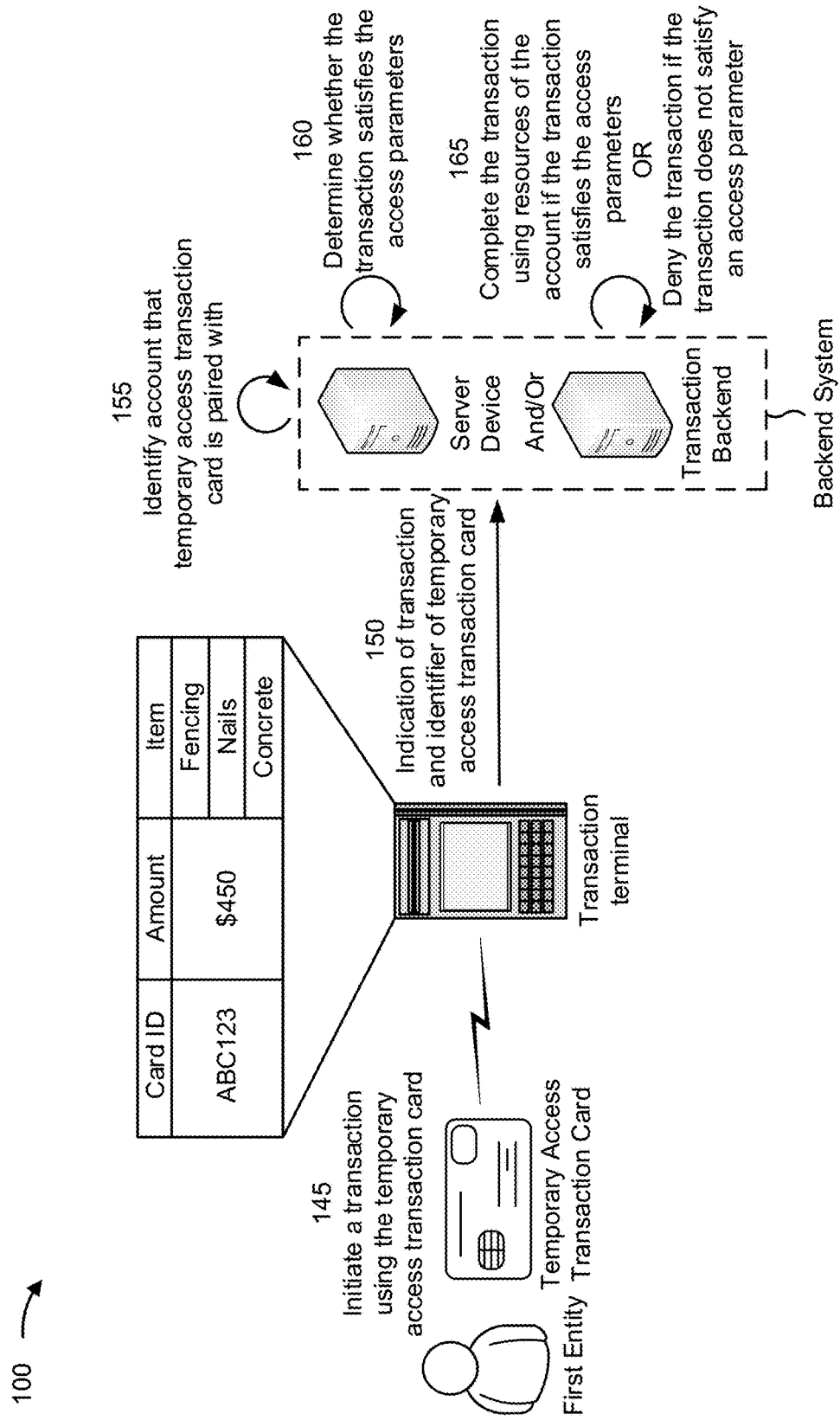

As shown in FIG. 1C, and by reference number 145, the first entity may initiate a transaction using the temporary access transaction card. For example, the temporary access transaction card may interact with or communicate with a transaction terminal at a merchant location. The temporary access transaction card may provide an identifier associated with the temporary access transaction card to the transaction terminal. In some implementations, the identifier may be a permanent identifier of the temporary access transaction card. In some implementations, the identifier may be associated with the account that the temporary access transaction card is paired with. In some implementations, the identifier may be a transaction token created by the server device, as described above. Therefore, the temporary access transaction card may indicate to the transaction terminal that the temporary access transaction card is paired with the account by providing the identifier, as described above.

The transaction terminal may receive the identifier provided by the temporary access transaction card. Additionally, the transaction terminal may identify transaction data associated with the transaction. For example, the transaction terminal may identify a total amount of the transaction. In some implementations, the transaction terminal may identify one or more goods or services associated with the transactions. For example, as shown in FIG. 1C, the transaction terminal may identify that the transaction total is $450 and the transaction is for fencing, nails, and concrete.

As shown by reference number 150, the transaction terminal may transmit the transaction data and the identifier provided by the temporary access transaction card to a backend system (the backend system may refer to the server device and/or a transaction backend). As shown by reference number 155, the backend system may identify the account with which the temporary access transaction card is paired. For example, the backend system may perform a lookup operation using the identifier provided by the temporary access transaction card. The backend system may identify the account that the temporary access transaction card is paired with based on performing the lookup operation. If the backend system determines that the temporary access transaction card is not paired with an account (e.g., by performing the lookup operation), then the backend system may deny or decline the transaction. Additionally, the backend system may identify the one or more access parameters associated with the pairing between the temporary access transaction card and the account. For example, the temporary access transaction card may provide a transaction token to the transaction terminal that maps to account information associated with the account and the one or more access parameters. The backend system may use the transaction token to identify the account information and the one or more access parameters.

As shown by reference number 160, the backend system may determine whether the transaction satisfies the one or more access parameters. For example, the backend system may determine whether the transaction amount satisfies the transaction amount parameter. In some implementations, the backend system may determine whether the transaction amount is less than or equal to a value indicated by the transaction amount parameter. As shown in FIG. 1C, the backend system may determine whether $450 is less than or equal to the value indicated by the transaction amount parameter (e.g., $1,000). If $450 is less than or equal to the value indicated by the transaction amount parameter, then the backend system may determine that the transaction amount is satisfied. Conversely, if $450 is greater than the value indicated by the transaction amount parameter, then the backend system may determine that the transaction amount is not satisfied. In some implementations, the backend system may determine a total amount charged by the temporary access transaction card while paired with the account (e.g., from previously completed transactions). The backend system may determine if the transaction amount from the transaction (e.g., $450 as shown in FIG. 1C) will cause the total amount charged by the temporary access transaction card to exceed a value indicated by the transaction amount parameter.

In some implementations, the backend system may determine a number of transactions previously made by the temporary access transaction card while paired with the account. For example, the backend system may determine a number of times the temporary access transaction card has completed transactions using the identifier that was provided by the temporary access transaction card. The backend system may determine whether the number of transactions previously made by the temporary access transaction card while paired with the account satisfies that transaction frequency parameter. For example, if the transaction frequency parameter indicates that the temporary access transaction card is permitted to complete 10 transactions while paired with the account and the backend system determines that the temporary access transaction card has previously completed 5 transactions while paired with the account, then the backend system may determine that the transaction frequency parameter is satisfied (e.g., as this will be the $6^{th}$ transaction completed by the temporary access transaction card while paired with the account, which is less than the 10 transactions permitted).

In some implementations, the backend system may determine a merchant associated with the transaction. The backend system may determine whether the merchant associated with the transaction is included in one or more permitted merchants identified by the permitted entity parameter. If the merchant is included in the one or more permitted merchants identified by the permitted entity parameter, then the backend system may determine that the permitted entity parameter is satisfied. Conversely, if the merchant is not included in the one or more permitted merchants identified by the permitted entity parameter, then the backend system may determine that the permitted entity parameter is not satisfied.

In some implementations, the backend system may analyze information associated with the transaction to determine one or more categories of goods or services associated with the transaction. For example, the transaction terminal may indicate one or more goods or services associated with the transaction. The backend system may determine the one or more categories from the indication of the one or more goods or services. For example, if the goods associated with the transaction are fencing, nails, and concrete, then the backend system may determine that a category associated with the transaction is building supplies. If the good associated with the transaction are bananas and yogurt, then the backend system may determine a category associated with the transaction is food. In some implementations, the backend system may use a machine learning technique to determine the one or more categories. The backend system may determine with the one or more categories associated with the transaction are included in one or more permitted categories identified by the permitted category parameter. If the one or more categories are included in the one or more permitted categories, then the backend system may determine that the permitted category parameter is satisfied. If the one or more categories are not included in the one or more permitted categories, then the backend system may determine that the permitted category parameter is not satisfied.

In some implementations, the backend system may determine a geographic location associated with the transaction. For example, the transaction terminal may indicate a geographic location of the transaction terminal. The backend system may determine a distance between the location of the transaction terminal and a location associated with the second entity. The backend system may determine whether the distance between the location of the transaction terminal and the location associated with the second entity satisfies the geographic parameter. In some implementations, the geographic parameter may indicate a permitted region (e.g., a permitted city and/or zip code). The backend system may determine whether the geographic location of the transaction terminal is within the permitted region. If the backend system determines that the location of the transaction terminal is within the permitted region, then the backend system may determine that the geographic parameter is satisfied. If the backend system determines that the location of the transaction terminal is outside of the permitted region, then the backend system may determine that the geographic parameter is not satisfied.

As shown by reference number 165, the backend system may determine whether any access parameters are not satisfied by the transaction. If the transaction satisfies all of the access parameters, then the backend system may complete the transaction using resources of the account (e.g., that is associated with the second entity). If the transaction does not satisfy at least one access parameter, then the backend system may deny the transaction.

In some implementations, the backend system may transmit a request to confirm the transaction to the user device associated with the second entity. If the user device transmits an indication that the transaction is confirmed, then the backend system may complete the transaction. If the user device transmits an indication that the transaction is not confirmed (or if the user device fails to respond to the request), then the backend system may deny the transaction. The backend system may transmit an indication of whether the transaction is completed or denied to the transaction terminal. In some implementations, the backend system may have an amount of time that the backend system can wait for the response from the user device before approving or denying the transaction. As described above, if the backend system does not receive a response from the user device before the amount of time expires, the backend system may deny the transaction. If the backend system receives an indication from the user device, indicating whether the transaction is confirmed, then the backend system may complete or deny a second attempt at completing the transaction based on the indication from the user device. For example, the first entity may attempt to complete the transaction a second time using the temporary access transaction card after the first transaction is denied. The backend system may determine whether the complete or deny the second transaction based on the indication from the user device that was received after the backend system denied the first transaction.

In some implementations, the backend system may transmit an indication of the transaction to the user device associated with the second entity. For example, the backend system may transmit an indication of the transaction data (e.g., a receipt, transaction amount, merchant, and/or goods or services purchased, among other examples) to the user device. In this way, the second entity may monitor and/or manage transactions completed (or attempted) using the temporary access transaction card while the temporary access transaction card is paired with the account that is associated with the second entity.

Figure 1D:
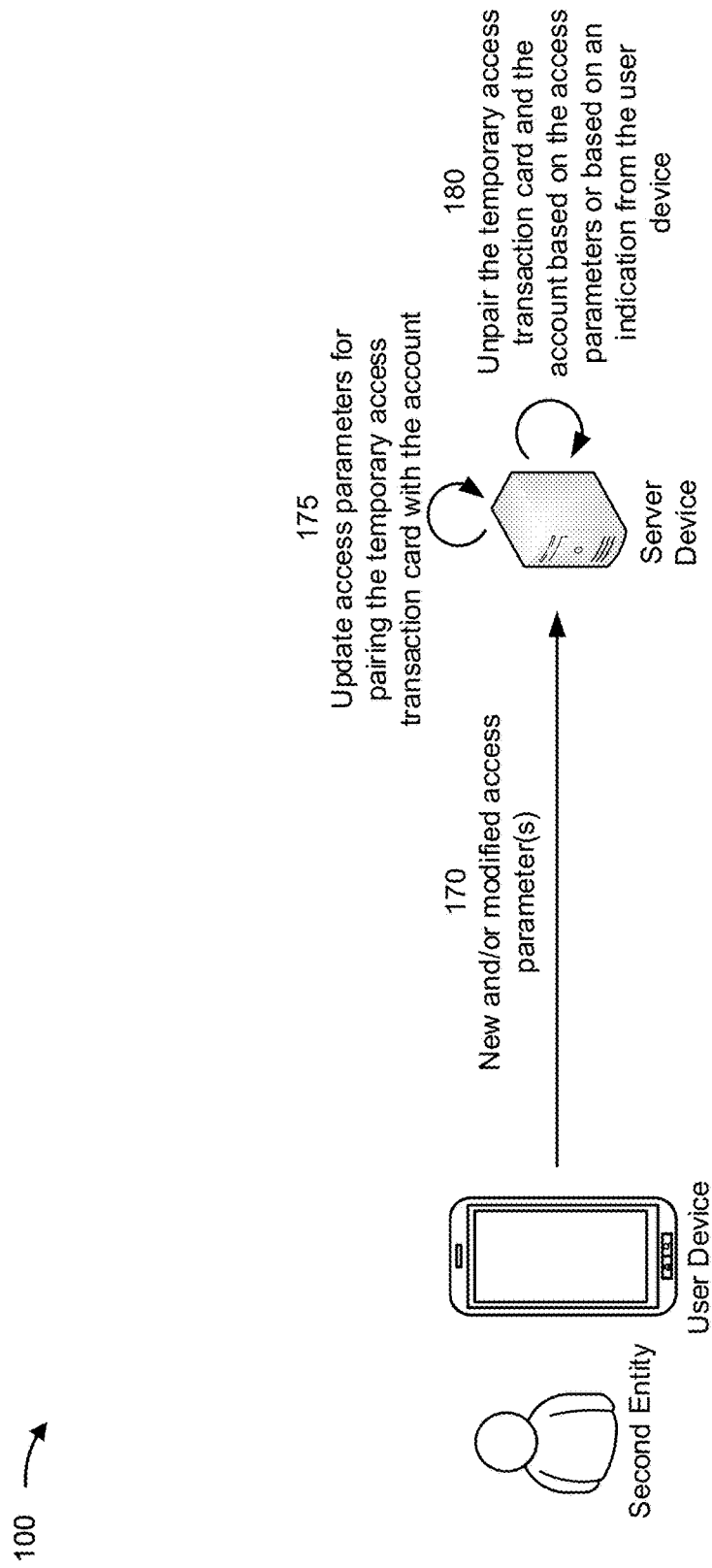

As shown in FIG. 1D, the second entity may manage the temporary access transaction card's access to the account after the temporary access transaction card has been paired with the account. For example, the second entity may input one or more new and/or modified access parameters into the user device. The second entity may modify an access parameter based on a request from the first entity. For example, the first entity may indicate that a transaction amount for a transaction is more than anticipated. As a result, the first entity may increase a value associated with the transaction amount parameter to enable the first entity to complete the transaction using the temporary access transaction card. In some implementations, the second entity may monitor, on the user device, transactions made using the temporary access transaction card. The second entity may modify and/or add a new access parameter based on the previous transactions completed using the temporary access transaction card.

As shown by reference number 170, the user device may transmit an indication of the one or more new or modified access parameters to the server device. As shown by reference number 175, the server device may update the access parameters based on the indication of the one or more new or modified access parameters. For example, the server device may update a value or information of an access parameter, or add a new value or new information for an access parameter, in a database stored by the server device. In some implementations, the server device may provide the updated access parameters to a transaction backend.

As shown by reference number 180, the server device may unpair, or otherwise disassociate, the temporary access transaction card and the account based on the access parameters. For example, the server device may automatically unpair the temporary access transaction card and the account after an amount of time indicated by the time parameter. The server device may automatically unpair the temporary access transaction card and the account based on determining that one or more access parameters were not satisfied by a transaction. In some implementations, server device may automatically unpair the temporary access transaction card and the account based on determining that a number of times that one or more access parameters were not satisfied by a transaction satisfies a threshold. For example, if the threshold is 4 and the temporary access transaction card attempts to complete 5 transactions that do not satisfy at least one access parameter, then the server device may automatically unpair the temporary access transaction card and the account. This improves security of the account and reduces a risk of fraud or unauthorized transactions made using the temporary access transaction card.

In some implementations, the user device may transmit an indication to the server device to unpair the temporary access transaction card and the account. For example, the second entity may determine that the temporary access transaction card should be unpaired from the account (e.g., prior to an amount time indicated by the time parameter expiring). The second entity may input an indication to the user device to unpair the temporary access transaction card and the account. The server device may unpair the temporary access transaction card and the account based on receiving the indication from the user device. Therefore, the user device may revoke the temporary access transaction card's access to the account implicitly by providing the one or more access parameters to the server device and/or explicitly by providing an indication to the server device to unpair the temporary access transaction card and the account.

The temporary access transaction card may be paired with another account (e.g., associated with a third entity) in a similar manner as described above. The temporary access transaction card can be used to complete transaction using the resources of the other account in a similar manner as described above. In this way, the temporary access transaction card can be used by the first entity to complete transactions on behalf of multiple different entities over time (e.g., using resources of accounts associated with the multiple different entities).

As indicated above, FIGS. 1A-1D are provided as an example. Other examples may differ from what is described with regard to FIGS. 1A-1D.

Figure 2:
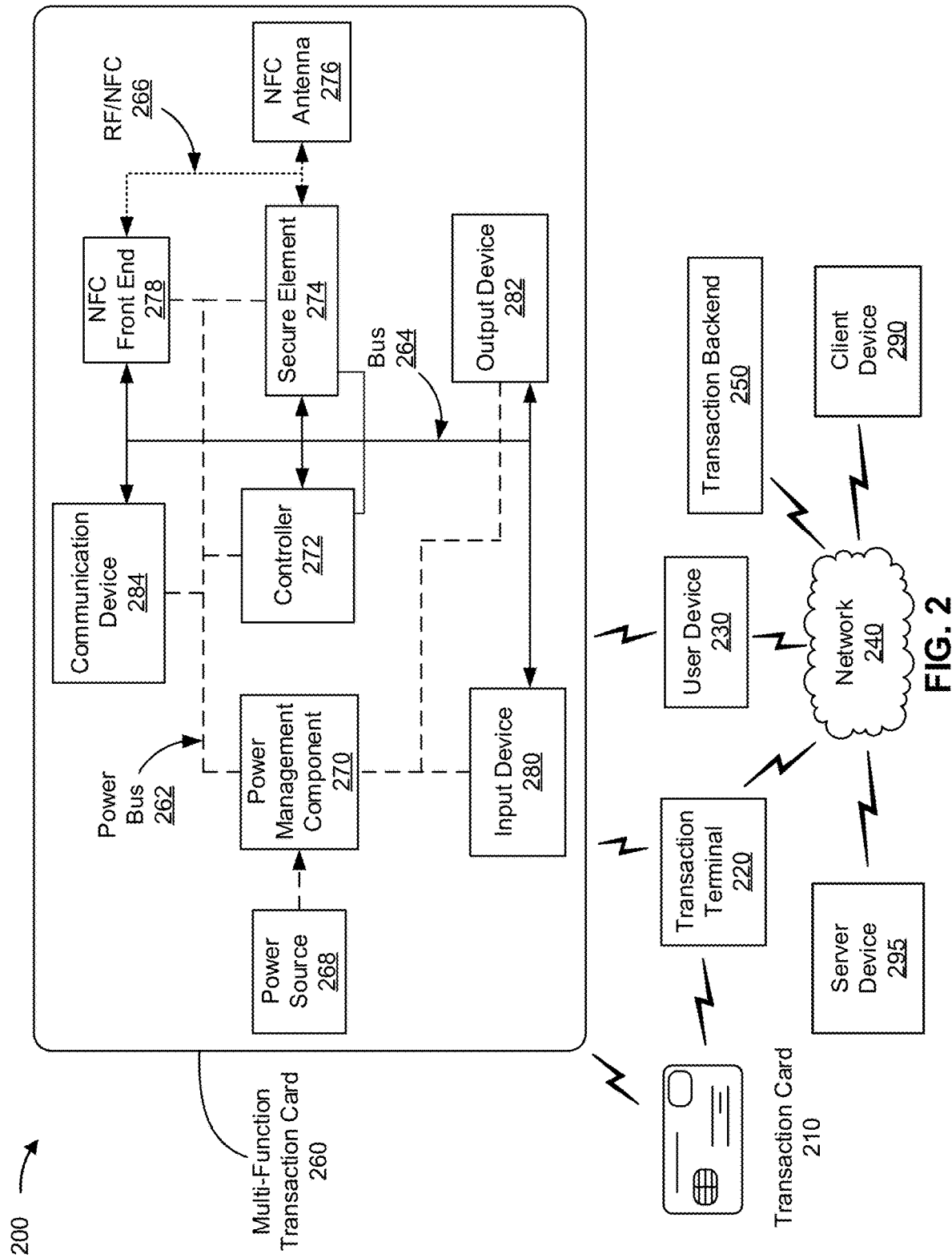
FIG. 2 is a diagram of an example environment in which systems and/or methods described herein may be implemented.

FIG. 2 is a diagram of an example environment 200 in which systems, devices, and/or methods, described herein, may be implemented. As shown in FIG. 2, environment 200 may include a transaction card 210, a transaction terminal 220, a user device 230, a network 240, a transaction backend 250, a multi-function transaction card 260, a client device 290 and a server device 295. Devices of environment 200 may interconnect via wired connections, wireless connections, or a combination of wired and wireless connections.

Transaction card 210 includes a transaction card capable of storing and/or communicating data for a point-of-sale (PoS) transaction with transaction terminal 220 and/or multi-function transaction card 260. For example, transaction card 210 may store or communicate data including account information (e.g., an account identifier and/or a cardholder identifier, among other examples), expiration information of transaction card 210, banking information, transaction information (e.g., a payment token), and/or the like. For example, to store or communicate the data, transaction card 210 may include a magnetic stripe and/or an IC chip (e.g., an Europay, Mastercard, and Visa (EMV) chip and/or the like). In some implementations, transaction card 210 may include an RF antenna to communicate data associated with transaction card 210, and/or may be capable of communicating wirelessly (e.g., via Bluetooth, Bluetooth Low Energy (BLE), near-field communication (NFC), and/or the like) with another device, such as transaction terminal 220 and/or multi-function transaction card 260, a digital wallet, user device 230, and/or the like. In some implementations, transaction card 210 may communicate with transaction terminal 220 and/or multi-function transaction card 260 to complete a transaction (e.g., based on being moved within communicative proximity of transaction terminal 220 and/or multi-function transaction card 260).

Transaction terminal 220 includes one or more devices to facilitate processing a transaction via transaction card 210 and/or multi-function transaction card 260. Transaction terminal 220 may include a PoS terminal, a security access terminal, an ATM terminal, and/or the like. Transaction terminal 220 may include one or more input devices and/or output devices to facilitate obtaining transaction card data from transaction card 210 and/or multi-function transaction card 260, and/or interaction or authorization from a cardholder of transaction card 210 and/or multi-function transaction card 260. Example input devices of transaction terminal 220 may include a number keypad, a touchscreen, a magnetic stripe reader, a chip reader, and/or an RF signal reader. Example output devices of transaction terminal 220 may include a display device, a speaker, a printer, and/or the like.

User device 230 includes one or more devices capable of receiving, generating, storing, processing, and/or providing information associated with transaction card 210 and/or multi-function transaction card 260. For example, user device 230 may include a communication device and/or a computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, user device 230 may include application logic capable of facilitating communications between transaction terminal 220 and multi-function transaction card 260.

Network 240 includes one or more wired and/or wireless networks. For example, network 240 may include a cellular network, a public land mobile network, a local area network, a wide area network, a metropolitan area network, a telephone network, a private network, the Internet, and/or a combination of these or other types of networks. Network 240 enables communication among the devices of environment 200.

Transaction backend 250 includes one or more devices associated with a bank and/or a transaction card association that authorizes transactions and/or facilitates a transfer of funds or payments between an account of a cardholder of transaction card 210 and/or multi-function transaction card 260 and an account of an individual or business of transaction terminal 220. For example, transaction backend 250 may include one or more devices of one or more issuing banks associated with a cardholder of transaction card 210 and/or multi-function transaction card 260, one or more devices of one or more acquiring banks (or merchant banks) associated with transaction terminal 220, and/or one or more devices associated with one or more card associations (e.g., VISA®, MASTERCARD®, and/or the like) associated with transaction card 210 and/or multi-function transaction card 260. Accordingly, in response to receiving transaction card data associated with transaction card 210 and/or multi-function transaction card 260 from transaction terminal 220, various banking institutions and/or card associations of transaction backend 250 may communicate to authorize the transaction and/or transfer funds between the accounts associated with transaction card 210, multi-function transaction card 260, and/or transaction terminal 220.

Multi-function transaction card 260 includes a transaction card capable of storing and/or communicating data for a PoS transaction with transaction terminal 220, and capable of receiving and/or storing data for a PoS transaction with transaction card 210, in a similar manner as described above in connection with transaction card 210. In some implementations, multi-function transaction card 260 may be a temporary access transaction card, as described elsewhere herein.

In some implementations, multi-function transaction card 260 may include a card body in or on which various components are embedded. In some implementations, multi-function transaction card 260 may include an antenna to communicate data associated with transaction terminal 220 and/or transaction card 210 and/or may be capable of communicating wirelessly (e.g., via Bluetooth, BLE, NFC, and/or the like) with another device, such as transaction terminal 220, transaction card 210, a digital wallet, or the like. In some implementations, multi-function transaction card 260 may communicate with transaction terminal 220, transaction card 210, and/or the like to complete a transaction (e.g., based on being moved within communicative proximity of transaction terminal 220, transaction card 210, and/or the like). In some implementations, multi-function transaction card 260 may include one or more components and/or one or more functionalities of transaction terminal 220 and/or one or more components and/or functionalities of transaction card 210.

Power bus 262 includes a component that permits the delivery of power to various components of multi-function transaction card 260. Bus 264 includes a component that permits communication among various components of multi-function transaction card 260. RF/NFC 266 may include a communication link that permits data delivery between secure element 274, NFC antenna 276, and NFC front end 278.

Power source 268 includes one or more devices, internal to multi-function transaction card 260, capable of supplying power. For example, power source 268 may include a battery (e.g., a rechargeable battery, a non-rechargeable battery, and/or the like), a power supply, a capacitor (e.g., a supercapacitor, an ultracapacitor, and/or the like), and/or the like. In some implementations, multi-function transaction card 260 (e.g., controller 272, secure element 274, and/or NFC front end 278) may obtain power from power source 268 when multi-function transaction card 260 is to perform a transaction.

Power management component 270 includes one or more devices capable of controlling the delivery of power to various components of multi-function transaction card 260 and/or controlling charging of power source 268. For example, power management component 270 may include a switch, a gate, a controller, a regulator, a processing component, a bidirectional logic level shifter, a diode, and/or the like. In some implementations, power management component 270 may control signals between controller 272 and secure element 274 (e.g., to couple or decouple controller 272 and secure element 274, to prevent signals from being passed between controller 272 and secure element 274, and/or the like).

Controller 272 includes one or more devices capable of receiving, generating, storing, processing, and/or providing information and/or instructions that assist with performing a transaction. For example, controller 272 may include a processor, a memory, and/or the like, as described elsewhere herein. In some implementations, controller 272 may be directly, communicatively coupled to secure element 274 (e.g., via a dedicated, single-wire communication link).

Secure element 274 includes one or more devices capable of securely hosting an operating system and/or an application, and/or storing confidential information (e.g., a credential, cryptographic information, and/or the like). For example, secure element 274 may include a universal integrated circuit card (UICC), a secure digital (SD) card (e.g., a microSD card and/or the like), an embedded secure element, and/or the like. In some implementations, secure element 274 may include a tamper resistant hardware platform. In some implementations, secure element 274 may include one or more processors (e.g., one or more microcontrollers) certified by a standard body group, such as an EMV Consortium (EMVCo) certified (e.g., 16-bit and/or the like) secure microcontroller. In some implementations, secure element 274 may host a personalized card application and a cryptographic key required to perform a financial transaction (e.g., with transaction terminal 220). In some implementations, secure element 274 may store a credential associated with multi-function transaction card 260 and/or another transaction card, such as a username, a password, biometric information, a token, a certificate for signing documents, and/or the like.

In some implementations, secure element 274 may include application logic configured to communicate with NFC front end 278 (e.g., to cause NFC front end 278 to provide card data from secure element 274 to transaction terminal 220 to submit a payment, to cause NFC front end 278 to receive card data from another transaction card (e.g., transaction card 210) to process a payment, and/or the like). In some implementations, secure element 274 may include application logic configured to communicate with controller 272 (e.g., to cause controller 272 to communicate with a user device (e.g., user device 230) to facilitate online data authentication relating to a transaction (e.g., with transaction card 210), to receive instructions from controller 272 to initiate transaction processing (e.g., associated with transaction card 210), and/or the like). In some implementations, secure element 274 may include application logic configured to receive inputs from input device 280 (e.g., directly or via controller 272), to provide outputs to output device 282 (e.g., directly or via controller 272), and/or the like.

NFC antenna 276 includes an antenna capable of transmitting and/or receiving information using an NFC protocol. For example, NFC antenna 276 may include a loop antenna (e.g., an NFC loop antenna), an inductor (e.g., an NFC inductor), and/or the like. In some implementations, NFC antenna 276 may be integrated into, or with, secure element 274 and/or NFC front end 278 (e.g., may be part of the same integrated circuit, such as a transaction IC).

NFC front end 278 includes one or more devices capable of communicating with external devices, such as transaction card 210 and/or transaction terminal 220, using an NFC protocol. NFC front end 278 may include one or more radio modules for receiving and/or emitting NFC signals. NFC front end 278 may include one or more processors (e.g., microprocessor(s), microcontroller(s), and/or the like) and/or be coupled to one or more processors, such as controller 272, processor(s) included in secure element 274, and/or the like.

Although not shown, in some implementations, multi-function transaction card 260 may include a transaction IC that includes an integrated circuit connecting secure element 274, NFC antenna 276, and/or one or more other components of multi-function transaction card 260. For example, the transaction IC may include secure element 274, NFC antenna 276, NFC front end 278, connection(s) between secure element 274, NFC antenna 276, and NFC front end 278, and/or the like.

Input device 280 includes one or more components that permit multi-function transaction card 260 to receive information, such as via user input (e.g., to initiate a transaction, such as to receive card data from transaction card 210). For example, input device 280 may include an input component described elsewhere herein. Output device 282 includes one or more components that permit multi-function transaction card 260 to provide output information (e.g., relating to transaction processing associated with transaction card 210 and/or transaction terminal 220). For example, output device 282 may include an output component described elsewhere herein. Communication device 284 includes a transceiver-like component that enables multi-function transaction card 260 to communicate with other devices. For example, communication device 284 may include a communication component described elsewhere herein.

The client device 290 may include one or more devices capable of receiving, generating, storing, processing, and/or providing information, such as information described herein. For example, client device 290 may include a mobile phone, a laptop computer, a tablet computer, a desktop computer, a handheld computer, a wearable communication device (e.g., a smart wristwatch, a pair of smart eyeglasses, etc.), or a similar type of device. In some implementations, the client device 290 may communicate with the server device 295 to establish an account for a temporary access transaction card, as described elsewhere herein.

The server device 295 may include one or more devices capable of receiving, storing, providing, generating, and/or processing information associated with managing and/or pairing transaction accounts, as described above. For example, server device 295 may include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, the server device 295 may pair accounts with a temporary access transaction card and/or may provide one or more access parameters associated with the pairing to a transaction backend.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
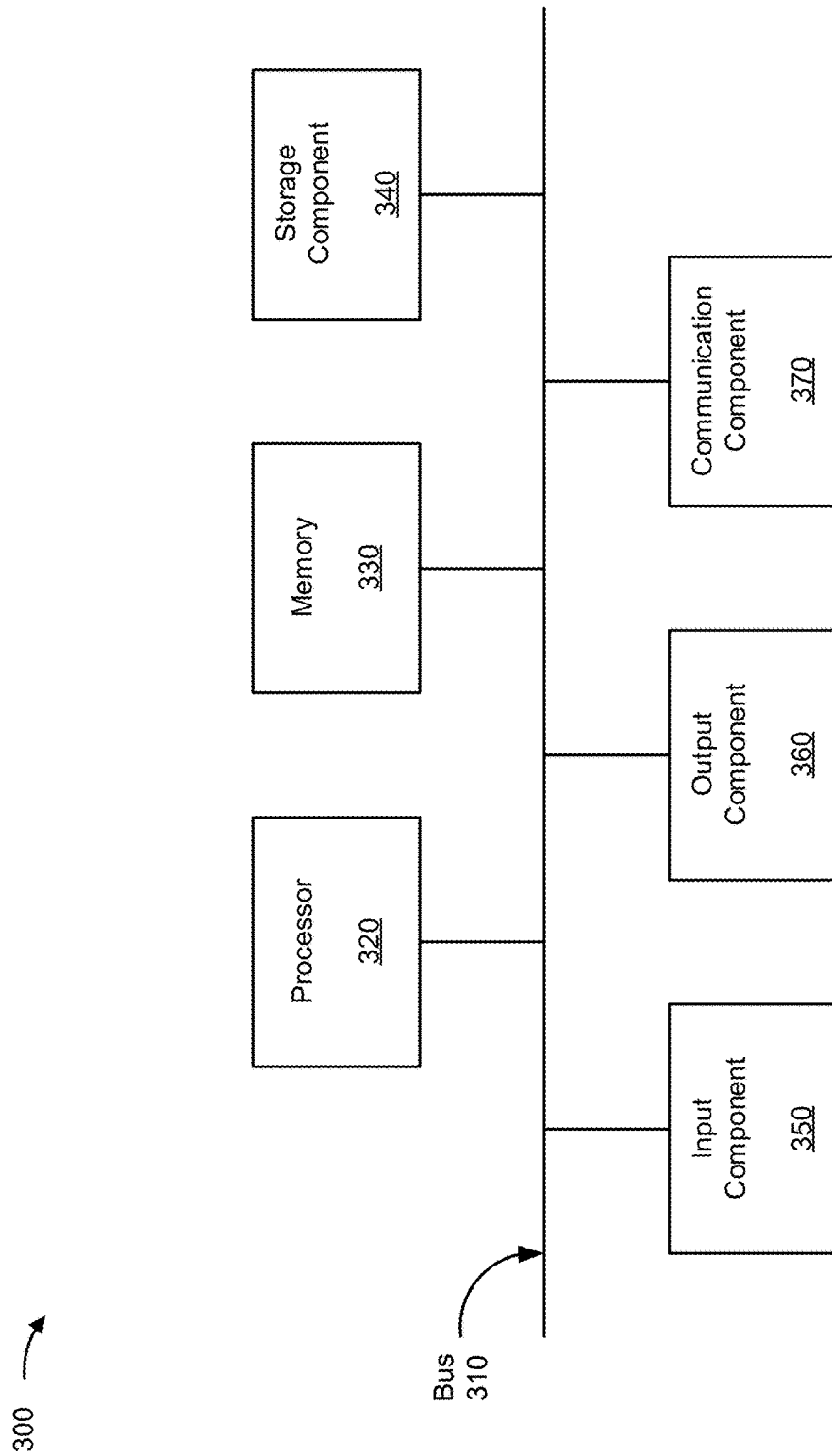
FIG. 3 is a diagram of example components of one or more devices of FIG. 2.

FIG. 3 is a diagram of example components of a device 300, which may correspond to transaction card 210, transaction terminal 220, user device 230, transaction backend 250, multi-function transaction card 260, client device 290, and/or server device 295. In some implementations, transaction card 210, transaction terminal 220, user device 230, transaction backend 250, multi-function transaction card 260, client device 290, and/or server device 295 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with a medium for temporary account access. In some implementations, one or more process blocks of FIG. 4 may be performed by a device (e.g., user device 230). In some implementations, one or more process blocks of FIG. 4 may be performed by another device or a group of devices separate from or including the device, such as transaction card 210, transaction terminal 220, transaction backend 250, multi-function transaction card 260, client device 290, and/or server device 295. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a request to grant temporary access to resources of an account associated with the first entity using a transaction card that is associated with a second entity (block 410). As further shown in FIG. 4, process 400 may include determining one or more parameters for limiting access to the resources of the account by the transaction card (block 420). As further shown in FIG. 4, process 400 may include granting temporary access to the resources of the account using the transaction card in accordance with the one or more parameters (block 430). In some implementations, transactions performed by the transaction card that satisfy the one or more parameters are associated with the account while temporary access is granted. As further shown in FIG. 4, process 400 may include revoking access to the resources of the account using the transaction card based on the one or more parameters or based on an input received by the device (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A physical medium, comprising:
a radio frequency (RF) component;
an integrated circuit (IC) chip component;
a memory; and
one or more processors, communicatively coupled to the memory, configured to:
 detect, via the RF component, that the physical medium is within a communicative proximity of a first user device or a first medium associated with a first account, wherein the physical medium is not permanently associated with an account;
 communicate, via the RF component, with the first user device or the first medium based on detecting that the physical medium is within the communicative proximity of the first user device or the first medium, wherein communicating includes:
  transmitting an indication of an identifier associated with the physical medium, and
  receiving an indication that the physical medium is temporarily paired with the first account, wherein the physical medium is temporarily paired with the first account based on one or more restrictions;
 configure the IC chip component to indicate that the physical medium is paired with the first account based on receiving the indication that the physical medium is to be paired with the first account;
 detect, via the RF component or the IC chip component, that the physical medium is within a communicative proximity of a terminal; and
 transmit, via the RF component or the IC chip component and to the terminal, an indication that the physical medium is paired with the first account, wherein the terminal performs an action associated with the first account based on the indication that the physical medium is paired with the first account.

2. The physical medium of claim 1, further comprising a card body, wherein the card body includes an identifier printed on the card body.

3. The physical medium of claim 1, further comprising a card body, wherein the card body does not include an identifier printed on the card body.

4. The physical medium of claim 1, wherein the one or more processors are further configured to:
 detect, via the RF component, that the physical medium is within a communicative proximity of a second user device or a second medium associated with a second account;
 communicate, via the RF component, with the second user device or the second medium based on detecting that the physical medium is within the communicative proximity of the second user device or the second medium, wherein communicating includes:
  transmitting an indication of the identifier associated with the physical medium, and
  receiving an indication that the physical medium is temporarily paired with the second account, wherein the physical medium is temporarily paired with the second account based on one or more restrictions; and
 configure the IC chip component to indicate that the physical medium is paired with the first account and the second account based on receiving the indication that the physical medium is to be paired with the second account.

5. The physical medium of claim 1, wherein the physical medium is a card or a user device.

6. A method, comprising:
 receiving, by a device associated with a first entity, a request to grant temporary access to resources of an account associated with the first entity using a transaction card that is associated with a second entity;
 determining, by the device, one or more parameters for limiting access to the resources of the account by the transaction card, based on at least one of:
  receiving, by the device, an input indicating at least one of the one or more parameters, or
  identifying, by the device, at least one stored parameter for limiting access to the resources of the account;
 granting, by the device, temporary access to the resources of the account using the transaction card in accordance with the one or more parameters,
  wherein transactions performed by the transaction card that satisfy the one or more parameters are associated with the account while temporary access is granted; and
 revoking, by the device, access to the resources of the account using the transaction card based on the one or more parameters or based on an input received by the device.

7. The method of claim 6, wherein receiving the request to grant temporary access to the resources of the account associated with the first entity using the transaction card associated with the second entity comprises:
 receiving, by the device and via near field communication (NFC), an indication from the transaction card,
 receiving, by the device, an indication that the transaction card has communicated via NFC with a transaction card associated with the account, or
 receiving, by the device, an indication of an identifier associated with the transaction card.

8. The method of claim 6, further comprising:
 transmitting, by the device and to a server device, a request to grant temporary access to the resources of the account using the transaction card; and
 receiving, by the device and from the server device, an indication that temporary access to the resources of the account using the transaction card is permitted.

9. The method of claim 6, further comprising:
 receiving, by the device, an indication of an additional parameter or a modified parameter, of the one or more parameters, for limiting access to the resources of the account by the transaction card after granting temporary access to the resources of the account using the transaction card; and
 modifying, by the device, the temporary access to the resources of the account using the transaction card based on the additional parameter or the modified parameter.

10. The method of claim 6, wherein the one or more parameters for limiting access to the resources of the account by the transaction card include at least one of:
 a time parameter,
 a transaction amount parameter,
 a transaction frequency parameter,
 a permitted entity parameter,
 a permitted category parameter, or
 a geographic parameter.

11. The method of claim 6, wherein revoking access to the resources of the account using the transaction card comprises:
- determining, based on the one or more parameters, that access to the resources of the account using the transaction card should be revoked, or
- receiving, by the device, an input indicating that access to the resources of the account using the transaction card is to be revoked.

12. The method of claim 6, wherein granting temporary access to the resources of the account using the transaction card enables the transaction card to perform a transaction, that is to be associated with the account by a server device, via:
- an integrated circuit chip component of the transaction card,
- a radio frequency component of the transaction card,
- a magnetic strip of the transaction card, or
- an identifier of the transaction card.

13. The method of claim 6, comprising:
- associating, by a first device, information related to a first entity with an identifier associated with a second device;
- receiving, by the first device, a request to pair the identifier with an account that is associated with a second entity;
- identifying, by the first device, one or more parameters associated with pairing the identifier with the account, wherein the one or more parameters are associated with limiting access to resources associated with the account by the second device;
- pairing, by the first device, the identifier with the account;
- receiving, by the first device, an indication associated with a transaction initiated by the second device; and
- performing, based on whether data associated with the transaction satisfies the one or more parameters, an action that comprises at least one of:
  - completing the transaction using the resources of the account when the data associated with the transaction satisfies the one or more parameters, or
  - denying the transaction when the data associated with the transaction does not satisfy the one or more parameters.

14. A non-transitory computer-readable medium storing a set of instructions, the set of instructions comprising:
- one or more instructions that, when executed by one or more processors of a server device, cause the server device to:
  - associate information of a first entity with an identifier of a payment medium;
  - receive a request to pair the identifier of the payment medium with an account that is associated with a second entity;
  - identify one or more parameters associated with pairing the identifier of the payment medium with the account that is associated with the second entity, wherein the one or more parameters limit access to resources of the account by the payment medium;
  - pair the identifier of the payment medium with the account that is associated with the second entity;
  - receive an indication of a transaction initiated by the payment medium; and
  - perform an action based on whether the transaction satisfies the one or more parameters, wherein the action includes:
    - completing the transaction using the resources of the account that are associated with the second entity if the transaction satisfies the one or more parameters, or
    - denying the transaction if the transaction does not satisfy the one or more parameters.

15. The non-transitory computer-readable medium of claim 14, wherein the payment medium is a transaction card associated with the first entity or a user device associated with the first entity.

16. The non-transitory computer-readable medium of claim 14, wherein the one or more instructions, when executed by the one or more processors, further cause the server device to:
- determine whether the payment medium can be paired with the account based on at least one of the information of the first entity or whether the payment medium is currently paired with one or more other accounts.

17. The non-transitory computer-readable medium of claim 14, wherein the one or more instructions, when executed by the one or more processors, further cause the server device to:
- receive a request to pair the identifier of the payment medium with an account that is associated with a third entity;
- identify one or more other parameters associated with pairing the identifier of the payment medium with the account that is associated with the third entity; and
- pair the identifier of the payment medium with the account that is associated with the third entity in accordance with the one or more other parameters.

18. The non-transitory computer-readable medium of claim 17, wherein the one or more instructions, when executed by the one or more processors, further cause the server device to:
- receive an indication of whether upcoming transactions are to be associated with the account that is associated with the second entity or the account that is associated with the third entity,
  wherein the one or more instructions, that cause the server device to perform the action, cause the server device to:
  - perform the action associated with the account that is associated with the second entity or the account that is associated with the third entity based on the indication of whether upcoming transactions are to be associated with the account that is associated with the second entity or the account that is associated with the third entity.

19. The non-transitory computer-readable medium of claim 14, wherein the one or more instructions, when executed by the one or more processors, further cause the server device to:
- unpair the identifier of the payment medium with the account that is associated with the second entity based on the one or more parameters or based on an input received from a user device that is associated with the second entity.

20. The non-transitory computer-readable medium of claim 14, wherein the one or more parameters include at least one of:
- a time parameter,
- a transaction amount parameter,
- a transaction frequency parameter,
- a permitted entity parameter,
- a permitted category parameter, or
- a geographic parameter.

* * * * *